United States Patent [19]

Braksmayer et al.

[11] 4,446,265

[45] May 1, 1984

[54] FLAME RETARDANT POLYPHENYLENE ETHER-STYRENE THERMOPLASTIC RESIN COMPOSITIONS

[75] Inventors: Diza P. Braksmayer, Cranbury, N.J.; Ronald F. Lovenguth, Doylestown, Pa.

[73] Assignee: FMC Corporation, Philadelphia, Pa.

[21] Appl. No.: 344,458

[22] Filed: Feb. 1, 1982

[51] Int. Cl.$^3$ .............................. C08K 5/52; C08K 5/53
[52] U.S. Cl. .................................... 524/139; 524/141; 524/143; 525/68
[58] Field of Search ..................... 524/139, 143, 141; 525/68

[56] References Cited

U.S. PATENT DOCUMENTS

| | | | |
|---|---|---|---|
| 3,257,337 | 6/1966 | Schoepfle et al. | 524/144 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,383,435 | 5/1968 | Cizek | 260/874 |
| 3,489,811 | 1/1970 | Drucker | 260/606.5 |
| 3,576,923 | 4/1971 | Rendell | 260/966 |
| 3,639,506 | 2/1972 | Haaf | 260/874 |
| 3,883,613 | 5/1975 | Cooper | 260/874 |
| 3,929,930 | 12/1975 | Izawa et al. | 260/874 |
| 3,929,931 | 12/1975 | Izawa et al. | 260/874 |
| 4,102,850 | 7/1978 | Cooper et al. | 525/68 |
| 4,123,410 | 10/1978 | Lee, Jr. | 524/141 |
| 4,154,775 | 5/1979 | Axelrod | 260/874 |
| 4,198,492 | 4/1980 | Izawa et al. | 525/68 |
| 4,278,588 | 7/1981 | Granzow | 524/139 |
| 4,282,139 | 8/1981 | Sugio et al. | 524/141 |
| 4,287,119 | 9/1981 | Braksmayer et al. | 524/139 |
| 4,313,864 | 2/1982 | Haaf et al. | 524/141 |

Primary Examiner—John Kight, III
Assistant Examiner—R. A. White
Attorney, Agent, or Firm—Robert W. Kell; Robert D. Jackson; Eugene G. Horsky

[57] ABSTRACT

A flame retardant polyphenylene ether-styrene resin composition having a UL-94 rating of V-1 or better, a heat distortion temperature greater than 92° C. and a melt viscosity at 260° C. of less than 200 pascal second is obtained by incorporating with said polyphenylene ether-styrene resin composition from about 4 to about 7 parts per hundred of a triaryl phosphate ester and from about 0.5 to about 3 parts per hundred of a 3-hydroxyalkyl phosphine oxide having the formula:

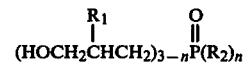

wherein $R_1$ may be the same or a different radical selected from the group consisting of hydrogen and the methyl radicals, $R_2$ is a radical of 4 to 8 carbon atoms and n is either zero or one.

14 Claims, No Drawings

FLAME RETARDANT POLYPHENYLENE ETHER-STYRENE THERMOPLASTIC RESIN COMPOSITIONS

The present invention relates to thermoplastic polyphenylene ether-styrene polymers which are rendered flame retardant by having incorporated therewith effective amounts of a triaryl phosphate ester and a 3-hydroxyalkyl phosphine oxide.

The polyphenylene ethers are known and described in numerous publications including U.S. Pat. Nos. 3,306,874 and 3,306,875 of Allan S. Hay and U.S. Pat. Nos. 3,257,357 and 3,257,358 of Gelu Stoeff Stamatoff. The high molecular weight polymers are high performance engineering thermoplastics possessing relatively high melt viscosities and softening points—that is, in excess of 275° C., and are useful for many commercial applications requiring high temperature resistance including formation of film, fiber and molded articles.

The combination of polyphenylene oxide ethers with polystyrene and modified polystyrene is also known and described in U.S. Pat. No. 3,385,435. The preferred polystyrenes are the high impact polystyrenes such as the styrene-acrylonitrile copolymers, styrene-butadiene copolymers and styrene-acrylonitrile-butadiene copolymers.

Other polyphenylene ether resin compositions that find wide use as an engineering thermoplastic are the graft copolymer compositions containing 30 to 90 weight percent of a polyphenylene ether that has been copolymerized with 10 to 70 weight percent of a styrene-type compound. The graft copolymer so obtained may have a number average molecular weight in the range of 50,000 to 200,000. Graft copolymers that are free from polyphenylene ether homopolymers may be prepared as described in U.S. Pat. No. 3,929,930 by polymerizing 20 to 200 parts by weight of a styrene-type compound at a temperature in the range of from 130° C. to 200° C. in the presence of 100 parts by weight of a polyphenylene ether and 0.1 to 15 parts by weight of a free radical initiator. The number average polymerization degree of the polyphenylene ether used is in the range from 50 to 300, preferably from 60 to 280 and more preferably from 70 to 250.

Such graft copolymers are known for their excellent moldability and are high performance engineering thermoplastics. Said graft copolymers are useful in many commercial applications requiring high temperature resistance including formation of film, fiber and molded articles.

The combination of (1) such graft copolymers of polyphenylene oxide ethers with (2) styrene-type compound polymers is also known and described in U.S. Pat. No. 3,929,931. Again, the preferred polystyrenes are the high impact polystyrenes such as the styrene-acrylonitrile copolymers, styrene-butadiene copolymers and styrene-acrylonitrile-butadiene copolymers.

The compositions discussed above which may contain graft copolymers of polyphenylene ether and/or polyphenylene ether homopolymers blended with polystyrene polymers and styrene copolymers are referred to in this specification and in the claims as "polyphenylene ether-styrene resin compositions." Such polyphenylene ether-styrene resin compositions may be rendered flame retardant by having incorporated therewith effective amounts of a triaryl phosphate ester and a 3-hydroxyalkyl phosphine oxide.

With the current and future federal requirements obligating automotive manufacuturers to improve the efficiency of their product and reduce fuel consumption, there is a substantial growth in the use of engineering plastics as a replacement for metal to achieve weight reduction. The use of polyphenylene ether-styrene resin compositions in the transportation, electrical/electronic and appliance categories accounts for a majority of its volume, and polyphenylene ether-styrene resin compositions are the dominant engineering thermoplastic in appliance use. Such compositions are in general, characterized as being relatively stable thermally upon long exposure to processing temperatures and shear. Upon exposure to flame, however, they burn quite readily as would be anticipated from their relative high styrene content. There is a substantial and increasing demand for flame retardant polyphenylene ether-styrene resin compositions.

To improve flame retardant characteristics, polyphenylene ether-styrene resin compositions have been compounded with flame retardant additives, for example, aromatic halogen compounds plus aromatic phosphates as described in U.S. Pat. No. 3,639,506. A preferred composition in accordance with that teaching comprises from 20% to 80% by weight of poly(2,6-dimethyl-1,4-phenylene) ether, 20% to 80% by weight of a high impact polystyrene (styrene modified with rubber) and from 3 to 25 parts by weight per 100 parts by weight of the polyphenylene ether-styrene resin composition of a flame retardant combination of 1 part triphenyl phosphate and 3 to 4 parts of a heavily chlorinated biphenyl. U.S. Pat. No. 4,154,775 states that cyclic phosphates are, by themselves, an effective, non-plasticizing flame retardant additive for polyphenylene ether-styrene compositions. Such additives, however, frequently degrade or cause degradation under processing conditions (extrusion at about 250° C.) resulting in poor mechanical performance of the thermoplastic polyphenylene ether-styrene resin compositions themselves.

U.S. Pat. No. 3,886,613 describes polyphenylene ether-styrene resin compositions that are rendered flame retardant by the addition of trimesityl phosphate. It is suggested that trimesityl phosphate is a better flame retardant additive for this resin than is triphenyl phosphate which results in a substantial decrease in the heat distortion temperature of the composition.

U.S. Pat. No. 4,287,119 describes polyphenylene ether-styrene resin compositions that are rendered flame retardant by the addition of a 3-hydroxyalkyl phosphine oxide. In Table I of that patent, a mixed isopropylphenyl/phenyl phosphate ester is disclosed as a fire retardant additive. Such mixed isopropylphenyl/phenyl phosphate esters, however, have the disadvantage that they lower the heat distortion temperature of the polyphenylene ether-styrene resin composition to which they are added.

In electing a fire retardant additive for a polyphenylene ether-styrene resin composition, the physical properties required for the end-use must be considered. Molded structures for business machines and other appliances may require a higher heat distortion temperature than would be necessary for a less demanding end-use. It is known that one may increase the heat distortion temperature by increasing the ratio of polyphenylene oxide to polystyrene in the resin composition or by decreasing the amount of fire retardant additive. Thus, the formulator has two degrees of freedom but is restricted by the fact that as the amount of fire retardant additive is decreased, the fire retardance decreases and the melt viscosity of the polyphenylene oxide-styrene resin composition increases.

As a matter of practicality, it is desirable that the channel flow at 260° C. be 48.26 cm or better (19 inches at 500° F.) and the melt viscosity at 260° C. (500° F.) should be less than about 200 pascal second (2,000 poise). Increasing the amount of polyphenylene oxide in the resin composition will increase the heat distortion temperature but will also increase the cost and melt viscosity (decrease the flow rate). Increasing the amount of polystyrene in the resin composition will have the opposite effect of reducing the cost, heat distortion temperature and increasing the melt viscosity. Increasing the amount of fire retardant additive will improve the fire retardance and decrease the melt viscosity but will also decrease the heat distortion temperature.

The formulator must, therefore, balance the composition of the polyphenylene ether-styrene resin composition and the amount of fire retardant additive with the fire retardance that is required, the cost of that particular polyphenylene ether-styrene resin composition, the desired heat distortion temperature and the melt viscosity required for the particular molding conditions.

It has now been discovered that the combination of two flame retardants, a 3-hydroxypropyl phosphine oxide and a triaryl phosphate ester provides three degrees of freedom in that it permits the formulator to obtain for any particular polyphenylene ether-styrene resin optimal heat distortion temperature, melt viscosity (flow) and fire retardance. Increasing the amount of the combined flame retardants added will reduce the melt viscosity but have little, if any, effect on the heat distortion temperature.

The present invention is predicated upon the discovery that a blend of a triaryl phosphate ester with a 3-hydroxypropyl phosphine oxide having the formula:

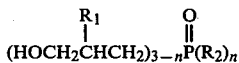

wherein $R_1$ may be the same or a different radical selected from the group consisting of hydrogen and the methyl radical, $R_2$ is an alkyl radical of 4 to 8 carbon atoms and n is either zero or one is an excellent flame retardant and when present in polyphenylene ether-styrene resin compositions in effective amounts affords the advantage of resistance to burning and improved melt viscosity without appreciably lowering the heat distortion temperature of the resin. The addition of the triaryl phosphate ester and 3-hydroxypropyl phosphine oxide to the polyphenylene ether-styrene resin composition in the amount required to improve flame retardant properties permits the formulator to improve the melt viscosity and flow characteristics of the resin composition without lowering the heat distortion temperature. The blend of 3-hydroxypropyl phosphine oxide and triaryl phosphate ester is readily compatible with the polyphenylene ether-styrene resin compositions and effective when added in small quantities, that is, from about 4 to about 7 parts per hundred of triaryl phosphate ester and from about 0.5 to about 3 parts per hundred of phosphine oxide. Particularly preferred compositions are flame retardant polyphenylene ether-styrene compositions to which have been added from about 4 to about 5 parts per hundred of triaryl phosphate ester and about 3 parts per hundred of a 3-hydroxyalkyl phosphine oxide.

In accordance with the present invention, a polyphenylene ether-styrene resin composition containing from about 30 to about 40 weight percent of a polyphenylene ether and from about 70 to about 60 weight percent of a polystyrene is rendered flame retardant by having incorporated with about 100 parts thereof from about 4 to about 7 parts by weight of a triaryl phosphate ester and from about 0.5 to about 3 parts by weight of a 3-hydroxypropyl phosphine oxide having the formula:

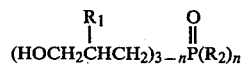

wherein $R_1$ may be the same or a different radical selected from the group consisting of hydrogen and the methyl radicals, $R_2$ is a radical of 4 to 8 carbon atoms and n is either zero or one. The resulting polyphenylene ether-styrene composition has a UL-94 rating of V-1 or better, a heat distortion temperature greater than about 92° C. and a melt viscosity at 260° C. (500° F.) less than about 200 pascal second (2,000 poise). The UL-94 rating when referred to throughout the specification and claims is determined on a specimen 1.588 mm (1/16") thick.

The flame resistant polyphenylene ether-styrene compositions having incorporated therein the triaryl phosphate ester and 3-hydroxypropyl phosphine oxide in accordance with the present invention are particularly advantageous for use in appliances, business machines, terminal strips, connectors and blocks.

The merits that may be attributed to the triaryl phosphate ester and 3-hydroxypropyl phosphine oxide mixture (relative to conventional flame retardant agents in present use) include no corrosion, non-toxicity, the use of polyphenylene ether-styrene resins that are low in cost (contains less polyphenylene ether), a high heat distortion temperature and excellent flow characteristics. Particularly advantageous in combination with a triaryl phosphate are the alkyl bis(3-hydroxypropyl) phosphine oxides such as the normal or secondary butyl bis(3-hydroxypropyl) phosphine oxide which is compatible with polyphenylene ether-polystyrene resins and has improved mixing parameters that lower the processing temperature. Also advantageous as flame retardant additives are mixtures of a triaryl phosphate ester with tris(3-hydroxypropyl) phosphine oxides such as tris(3-hydroxypropyl) phosphine oxide, tris(2-methyl-3-hydroxypropyl) phosphine oxide and mixture of the same.

3-Hydroxypropyl phosphine oxides may be prepared by first reacting a 3-hydroxy-1,2-unsaturated olefin such as allyl alcohol with phosphine in the presence of a free radical catalyst as described in U.S. Pat. No. 3,489,811. We have discovered that the use of stoichiometric quantities of reactants (or less than about 4% excess alcohol) reduces the formation of higher molecular weight by-products. The 3-hydroxyalkyl phosphine obtained by this process is readily converted to the corresponding phosphine oxide by oxidation with hydrogen peroxide.

An example of phosphine oxide useful with a triaryl phosphate as fire retardant additives in polyphenylene ether-styrene resin compositions is the tris(3-hydroxypropyl) phosphine oxide, derived from allyl alcohol. Tris(3-hydroxy-2-methylpropyl) phosphine oxide, derived from methallyl alcohol may also be used as a fire retardant additive but is more volatile.

Phosphine oxides having different 3-hydroxyalkyl groups on the phosphorus atom such as:

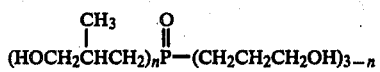

wherein n is either 1 or 2, may be prepared by reacting phosphine with a mixture of allyl and methallyl alcohol and oxidizing the resulting product. Such mixed phosphine oxides are more volatile than the tris(3-hydroxypropyl) phosphine oxide. The relative volatility of this series of compounds (rate of vaporization by thermogravimetric technique) in order of increasing volatility is tris(3-hydroxypropyl) phosphine oxide, bis(3-hydroxypropyl) 2-methyl-3-hydroxypropyl phosphine oxide, tris-(2-methyl-3-hydroxypropyl) phosphine oxide and 3-hydroxypropyl bis(2-methyl-3-hydroxypropyl) phosphine oxide. These mixed phosphine oxides as well as physical mixtures of such mixed phosphine oxides with tris(3-hydroxypropyl) phosphine oxide and/or tris(2-methyl-3-hydroxypropyl) phosphine oxide are useful additives in combination with triaryl phosphate esters in preparing flame retardant polyphenylene ether-styrene resin compositions.

The triaryl phosphate esters that are incorporated with the 3-hydroxyalkyl phosphine oxide in the polyphenylene oxidestyrene resin compositions of the present invention are preferably the mixed isopropylphenyl/phenyl phosphate ester compositions prepared by the method described in U.S. Pat. No. 3,576,923 from a synthetic alkylate. The molecular weight of the mixed ester may vary from about 369 to about 390 and the ratio of the moles of isopropyl radicals to phosphorus atoms present in the mixed ester may be between about 1:1 and about 1.5:1.

Other triaryl phosphates which are useful in combination with the 3-hydroxyalkyl phosphine oxides as a mixed fire retardant additive in the polyphenylene oxide-styrene resin compositions of the present invention are triphenyl phosphate, tricresyl phosphate, phenyl/cresyl phosphate, trimesityl phosphate, phenyl/mesityl phosphate and mixtures of the same.

The following examples will more fully illustrate the invention.

EXAMPLE I

Preparation of Tris(3-Hydroxypropyl) Phosphine Oxide

Into a one liter pressure reactor is placed 307 g (5.3 moles) allyl alcohol and 20 ml of a solution containing 3 g azobisisobutyronitrile dissolved in 100 ml of allyl alcohol. The pressure reactor is closed and charged with 36 g (1.06 moles) of phosphine. The reaction mixture is agitated by rocking the reactor for two hours at 80° C. The reaction mixture is permitted to cool to room temperature and the pressure vessel is vented in a hood to release any unreacted phosphine. An additional 20 ml of the azobisisobutyronitrile solution described above is added to the reactor which is closed and the system is again heated to 80° C. and rocked for one hour. The addition of 20 ml of the azobisisobutyronitrile solution is repeated with intermediate agitation at 80° C. for one hour under pressure until all of the azobisisobutyronitrile solution (100 ml) has been added. The contents of the reactor are then heated to 80° C. under pressure and rocked for an additional five hours.

The yellow solution that results from the above reaction is vacuum distilled by heating to about 85° C./133 Pa (1 mm Hg) and maintaining at that temperature and pressure for about four hours to remove volatiles [mono-, and bis(3-hydroxypropyl) phosphine] and unreacted allyl alcohol. The residue remaining in the distillation pot is a clear yellow syrup weighing 184 g.

This non-volatile yellow syrup is dissolved in an equal volume of a 50:50 mixture of isopropanol/methanol and oxidized by stirring with the dropwise addition of a 30% aqueous hydrogen peroxide solution diluted with an equal volume of isopropanol. When the exothermic reaction subsides, the solution of phosphine oxide is tested by adding one drop of the solution to 1 ml of carbon disulfide until no red coloration can be detected visually in the carbon disulfide layer. This indicates complete oxidation of the phosphine to tris-(3-hydroxypropyl) phosphine oxide.

Following oxidation with hydrogen peroxide, the solvents (water, isopropanol and methanol) are removed from the reaction product by heating to 65° C. under vacuum. The viscous yellow slush which remains is filtered through a Buchner Funnel to collect 42.4 grams of a white solid that is insoluble in isopropanol at room temperature. The yield, based on the phosphine used is 17.8%. After washing with isopropanol and air drying, the white solid analyses for tris(3-hydroxypropyl) phosphine oxide.

| Found | Theory |
|---|---|
| C = 48.29% | C = 48.21% |
| H = 9.28% | H = 9.38% |
| P = 13.3% | P = 13.84% |

In a similar manner, 2-methyl-3-hydroxypropyl bis-(3-hydroxypropyl) phosphine oxide may be prepared by reacting one mole of methallyl alcohol and two moles of allyl alcohol with phosphine and oxidizing with hydrogen peroxide. Three pph of this compound and 5 pph of a triaryl phosphate when incorporated with a polyphenylene oxide-styrene thermoplastic resin composition containing 30 weight percent polyphenylene ether and 70 weight percent high impact polystyrene results in a UL-94 rating of V-1, a heat distortion temperature greater than 92° C. and a melt viscosity at 260° C. less than 200 pascal second.

EXAMPLE II n-Butyl-bis(3-Hydroxypropyl) Phosphine Oxide

Into a four liter stainless steel pressure reactor is placed 0.5 g azobisisobutyronitrile dissolved in 600 ml of toluene. The reactor is purged with nitrogen and charged with 112 g (2.0 moles) of butene and 102 g (3.0 moles, 50% excess) phosphine. The reaction mixture is heated and stirred at 85° C.–90° C. for one hour and maintained at that temperature with stirring while five 20 ml portions of azobisisobutyronitrile solution (5.5 g in 350 ml of toluene) are added at 20 minutes intervals over 1 hour 40 minutes. No exotherm is noted during the catalyst addition and the pressure reading dropped from 1.432 MPa (190 psig) (at the time of the first 20 ml catalyst addition) to 1.397 MPa (185 psig) (20 minutes after the last catalyst addition).

The excess phosphine is vented from the reaction vessel and 278 g (4.8 moles, 20% excess) of allyl alcohol and 40 ml of the azobisisobutyronitrile catalyst solution is added to the reaction vessel. No exotherm is observed and heating is continued at 85° C.–90° C. with stirring and addition of 20 ml of azobisisobutyronitrile every 20 minutes until all of the catalyst solution (350 ml) has been added. The temperature is maintained with stirring at 85° C.–90° C. for 11 hours. A clear yellow liquid is removed from the reactor and heated to 110° C./–133 Pa (1 mm Hg) to distill off the volatile materials. The residue is a clear yellow liquid weighing 290.9 grams. This residue is dissolved in an equal volume of isopropanol and oxidized with 30% hydrogen peroxide dissolved in an equal volume of isopropanol as described above in Example I to give 308.2 g of a viscous yellow liquid (after removal of water and isopropanol) containing a small amount of a white suspended solid. The mixture is diluted with chloroform, filtered to remove the white solid, and the chloroform is evaporated to give a clear yellow liquid. The analyses of this liquid product is:

| Found (%) | Calculated for n-butyl bis(3-hydroxypropyl) phosphine oxide (%) |
|---|---|
| C = 54.50, 54.40 | 54.05 |
| H = 10.21, 10.21 | 10.36 |
| P = 13.28, 13.65 | 13.96 |

Three pph of this compound and 5 pph of a triaryl phosphate when incorporated with a polyphenylene oxide-styrene resin composition containing 30 weight percent polyphenylene ether and 70 weight percent high impact polystyrene results in a UL-94 rating of V-1, a heat distortion temperature greater than 92° C. and a melt viscosity at 260° C. less than 200 pascal second.

EXAMPLE III

Preparation of Tris(3-Hydroxy-2-Methylpropyl) Phosphine Oxide

Tris(3-hydroxy-2-methylpropyl) phosphine is prepared by the method described in Example I above.

Into a four liter pressure reactor equipped with a stirrer and thermometer is placed 690 g (9.6 moles) of methallyl alcohol and 40 ml of a solution containing 9 g azobisisobutyronitrile dissolved in 200 ml of toluene. The pressure reactor is closed and charged with 96 g (2.8 moles) of phosphine. The reaction mixture is heated with stirring to 60° C. at which temperature the reaction becomes exothermic and the temperature rises to 107° C. Stirring is continued as the temperature subsides from 107° C. to 90° C. and the pressure drops from 803.2 KPa to 349 KPa (100 psig to 50 psig). The temperature is maintained at 90° C. with heating and stirring for one hour at which time 50 ml of the azobisisobutyronitrile solution in toluene is pumped into the reactor. The reaction mixture is maintained at 90° C. for one hour with stirring after the second addition of catalyst. The addition of 50 ml of the azobisisobutyronitrile solution is repeated with continuous stirring at 90° C. each hour until all of the azobisisobutyronitrile solution (200 ml) has been added. The contents of the reactor are then stirred while maintaining the temperature at 90° C. for an additional four hours. After the last addition of catalyst solution, the pressure in the reaction vessel has dropped to atmosphere pressure.

The reaction mixture is cooled to room temperature, removed from the reaction vessel and heated up to 35° C. at 266.6 Pa (2 mm Hg) to distill off the volatile components (toluene, methallyl alcohol, mono- and bis-addition products).

The non-volatile colorless liquid residue tris-(b 3-hydroxy-2-methylpropyl) phosphine weighs 614.7 g. It is dissoved in an equal volume of isopropanol and chilled on ice. The phosphine present in solution is oxidized by the dropwise addition with stirring of a 30% aqueous hydrogen peroxide solution diluted with an equal volume of isopropanol. Inasmuch as the oxidation reaction is exothermic, the course of the reaction may be followed by the temperature increase upon addition of hydrogen peroxide. When the exotherm subsides, a small aliquot of the reaction mixture is tested after each addition of hydrogen peroxide with hydrogen peroxide test paper and by addition of a few drops of the reaction mixture to 1 ml of carbon disulfide. At the end of the oxidation reaction, the observed red color of the carbon disulfide indicative of unoxidized phosphine, disappears and the hydrogen peroxide test paper indicates the presence of hydrogen peroxide.

When the oxidation of the phosphine to phosphine oxide has been completed, the water and isopropanol are removed from the phosphine oxide by heating to 65° C. under vacuum until all volatiles have distilled off. The residue, a clear colorless viscous liquid, weighs 633.5 g and has the following analyses:

| Found (%) | Theory (%) |
|---|---|
| C = 54.59 | C = 54.14 |
| H = 9.35 | H = 10.15 |
| P = 11.1 | P = 11.65 |

The "theory" values are calculated for tris(3-hydroxy-2-methylpropyl) phosphine oxide.

Three pph of this compound and 5 pph of a triaryl phosphate when incorporated with a polyphenylene oxide-styrene resin composition containing 30 weight percent polyphenylene ether and 70 weight percent high impact polystyrene results in a UL-94 rating of V-1, a heat distortion temperature greater than 92° C. and a melt viscosity at 260° C. less than 200 pascal second.

EXAMPLE IV s-Butyl bis(3-Hydroxypropyl) Phosphine Oxide

Into a 4 liter stainless steel pressure reactor is placed 224 g (4 moles) of mixed 2-butene, 600 ml of toluene, 204 g (6.0 moles, 50% excess) of phosphine and 25 ml of a solution of 4 g azobisisobutyronitrile in 100 ml of toluene. The reaction vessel is heated and stirred at 85° C. to 90° C. for one hour and the remaining azobisisobutyronitrile solution is added in 25 ml portions every 30 minutes until the 100 ml of catalyst solution is used up. The reaction mixture is heated and stirred at 90° C. for 4 hours after the last addition of catalyst solution and then allowed to cool overnight.

The phosphine is vented from the reaction vessel and 487 g (8.4 moles, 5% excess) allyl alcohol is added together with 50 ml of a solution of 8 g azobisisobutyronitrile in 20 ml of toluene. The reaction mixture is heated with stirring at 90° C. with the addition of 50 ml azobisisobutyronitrile catalyst solution every 30 minutes until all 200 ml of solution has been added. Heating and stirring are continued at 90° C. for 4 hours and the reaction vessel is then allowed to cool to room temperature. The liquid from the reaction vessel is heated to 130° C./200 Pa (130° C./1.5 mm Hg) to remove volatile components. The residual product is a greenish liquid weighing 519.3 g.

The residual product is believed to contain both s-butyl bis(3-hydroxypropyl) phosphine and 3-hydroxypropyl di-s-butyl phosphine. It is dissolved in an equal volume of isopropanol and oxidized with 30% hydrogen peroxide in an equal volume of isopropanol as described above in Example I until a negative carbon disulfide reading is obtained. The solution of oxidized phosphine is concentrated under reduced pressure to yield a syrupy yellow liquid weighing 555.6 g (99.2% yield on oxidation or a yield of 62.5% based on the starting butene).

This product has the following analyses:

| Found (%) | Calculated for s-butyl bis(3-hydroxypropyl) phosphine oxide (%) |
|---|---|
| C = 51.80, 52.06 | 54.05 |
| H = 8.72, 8.94 | 10.36 |
| P = 13.79 | 13.96 |

The fire retardant effect of this compound and an isopropylphenyl/phenyl phosphate ester when incorporated with polyphenylene oxide-styrene resin compositions is described below in Example VII.

EXAMPLE V

Isopropylphenyl/phenyl Phosphate

Phenol was alkylated by the method described in U.S. Pat. No. 3,576,923 to give an alkylate containing 60 weight percent phenol, 27 weight percent 2-isopropyl phenol, 11 weight percent 3- and 4-isopropylphenol, 0.2 weight percent 2,6-diisopropyl phenol and 1.6 weight percent 2,4-diisopropyl phenol. This alkylate was then reacted with phosphorous oxychloride in accordance with U.S. Pat. No. 3,576,923 to give an isopropylphenyl/phenyl phosphate ester having a molecular weight of 369 and containing one isopropyl radical per molecule (ratio of isopropyl substituents:phosphorus atoms is 1:1).

This mixed phosphate ester may be used with a phosphine oxide as a flame retardant additive for polyphenylene etherstyrene resin compositions in the practice of the present invention.

EXAMPLE VI

Isopropylphenyl/phenyl Phosphate

By the procedure described above in Example V an isopropylphenyl/phenyl phosphate was prepared having a molecular weight of 390 and a ratio of isopropyl substituents to phosphorus of 1.5:1.

This mixed phosphate ester may also be used with a phosphine oxide as a flame retardant additive in the practice of the present invention.

EXAMPLE VII

Effect of Isopropylphenyl/phenyl Phosphate and s-Butyl bis(3-Hydroxypropyl) Phosphine Oxide Blend As A Flame Retardant For Polyphenylene Ether-Styrene Resin Compositions This Example illustrates the advantage of a particular phosphine oxide, isopropylphenyl/phenyl phosphate ester additive in the practice of the present invention.

Three parts by weight of s-butyl bis(3-hydroxypropyl) phosphine oxide prepared as described in Example IV and 5 parts by weight of isopropylphenyl/phenyl phosphate having a molecular weight of 369 prepared as described in Example V are added to 100 parts by weight of a polyphenylene ether-styrene resin composition containing 30% by weight polyphenylene oxide and 70% by weight high impact polystyrene and dispersed through the resin. Mixing of the additive and resin is accomplished in a Haake Mixer (HAAKE RHEOMIX MODEL 600 with REOCORD EU10 attachment, manufactured by Haake Inc., 224 Saddle River Road, Saddle Brook, N.J. 07662). The mixing takes place at 220° C. The Underwriter Laboratories rating (Vertical Burn Test) for this polyphenylene ether-styrene resin composition was marginal V-0 but solid V-1.

In testing the polyphenylene ether-styrene composition containing the flame retardant additives, the flame retardant properties are determined following procedures established by the Underwriter Laboratories Bulletin No. 94, STANDARD FOR TESTS FOR FLAMMABILITY OF PLASTIC MATERIALS FOR PARTS IN DEVICES AND APPLIANCES; Second Edition, Second Impression (as revised to Feb. 1, 1974) dated July 30, 1976. Tests were run on 1.588 mm (1/16 inch) specimens and the Vertical Burn Test for classifying Materials 94 V-0 and 94 V-1 is described in Section 3 of this publication. In this test, the V-0 rating indicates the best flame resistance and the V-1 rating indicates less flame resistance.

The flame retardant polyphenylene ether-styrene composition of this Example had a heat distortion temperature of 92+° C. (199° F.) and a melt viscosity at 260° C. of 122 pascal second (1,220 poise) was obtained.

The effect of changing the fire retardant additive of the present invention upon the physical properties of a 40 weight percent polyphenylene oxide/60 weight percent high impact polystyrene composition is illustrated by the experimental data that is summarized in Table I. The effect of changing the composition of the polyphenylene ether-styrene resin is illustrated in Table II.

The invention in its broader aspects is not limited to the specific details shown and described but departure may be made from such details within the scope of the accompanying claims without departing from the principles of the invention and without sacrificing its chief advantage.

TABLE I

FIRE RETARDANT BLENDS

| Res-in[1] | Fire Retardant[2] | P[3] | H.D.T.[4] | UL-94[5] | Visc.[6] | Flow[7] |
|---|---|---|---|---|---|---|
| A | 0 | 0 | 117° C. | F | 250 | 34.3 |
| A | 4 TAP | .3 | 104° C. | F | 210 | 42.5 |
| A | 8 TAP | .6 | 95° C. | V-1 | 170 | 53.3 |
| A | 7.2 TAP/0.5 PO | .6 | 97° C. | V-1 | 186 | 48.3 |
| A | 5.6 TAP/1.6 PO | .6 | 100° C. | V-1 | 186 | 48.3 |

TABLE I-continued

FIRE RETARDANT BLENDS

| Resin[1] | Fire Retardant[2] | P[3] | H.D.T.[4] | UL-94[5] | Visc.[6] | Flow[7] |
|---|---|---|---|---|---|---|
| A | 4 TAP/2.5 PO | .6 | 104° C. | V-1 | 191 | 48.3 |
| A | 4 PO | .5 | 110° C. | V-1 | 221 | 38.7 |

[1]Polyphenylene ether-styrene resin composition.
A = 40 weight percent polyphenylene ether, 60 weight percent high impact polystyrene.
[2]Fire Retardant.
TAP = parts per hundred of fire retardant of Example V.
PO = parts per hundred of phosphine oxide of Example IV.
[3]Weight percent phosphorus in resin composition.
[4]H.D.T. = Heat distortion temperature, (⅛", 3.18 mm thick).
[5]UL-94 = Underwriters Laboratory Rating (1/16", 1.588 mm thick),
F = complete burn.
[6]Visc. = melt viscosity (pascal second) at 260° C.
[7]Flow = flow in centimeters at 260° C.

TABLE II

FIRE RETARDANT BLENDS

| Resin[1] | Fire Retardant[2] | P[3] | H.D.T.[4] | UL-94[5] | Visc.[6] |
|---|---|---|---|---|---|
| A | 8 TAP | .6 | 95° C. | V-1 | 212 |
| B | 4 TAP/3 PO | .7 | 101° C. | V-1 | 154 |
| C | 12 TAP | .9 | 79° C. | V-1 | 129 |
| A | 12 TAP | .9 | 84° C. | V-1 | 175 |
| D | 5 TAP/3 PO | .8 | 92.8° C. | V-1/V-0 | 122 |

[1]Polyphenylene ether-styrene resin composition.
A = 40 weight percent polyphenylene ether, 60 weight percent high impact polystyrene.
B = 34 weight percent polyphenylene ether, 66 weight percent high impact polystyrene.
C = 35 weight percent polyphenylene ether, 65 weight percent high impact polystyrene.
D = 30 weight percent polyphenylene ether, 70 weight percent high impact polystyrene.
[2]Fire Retardant.
TAP = parts per hundred of fire retardant of Example V.
PO = parts per hundred of phosphine oxide of Example IV.
[3]Weight percent phosphorus in resin composition.
[4]H.D.T. = Heat distortion temperature, (⅛", 3.18 mm thick).
[5]UL-94 = Underwriters Laboratory Rating (1/16", 1.558 mm thick),
F = complete burn.
[6]Visc. = melt visoosity (pascal second) at 260° C.

We claim:

1. A polyphenylene ether-styrene resin composition containing from about 30 to about 40 weight percent of a polyphenylene ether and from about 70 to about 60 weight percent of a polystyrene, said polyphenylene ether-styrene resin composition being rendered flame retardant by having incorporated therewith about 100 parts thereof, from about 4 to about 7 parts by weight of a triaryl phosphate ester, and from about 0.5 to about 3 parts by weight of a 3-hydroxyalkyl phosphine oxide having the formula:

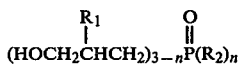

$$(HOCH_2CHCH_2)_{3-n} \overset{O}{\overset{\|}{P}}(R_2)_n$$
$$\underset{|}{R_1}$$

wherein $R_1$ may be the same or a different radical selected from the group consisting of hydrogen and the methyl radical, $R_2$ is a radical of 4 to 8 carbon atoms and n is either zero or one; and said polyphenylene ether-styrene resin having a UL-94 rating of V-1 or better, a heat distortion temperature greater than about 92° C. and a melt viscosity at 260° C. less than 200 pascal second.

2. The polyphenylene ether-styrene resin composition of claim 1 wherein said polystyrene is a high impact polystyrene.

3. The polyphenylene ether-styrene resin composition of claim 1 wherein the triaryl phosphate is isopropylphenyl/phenyl phosphate.

4. The polyphenylene ether-styrene resin composition of claim 3 wherein said isopropylphenyl/phenyl phosphate has a molecular weight of about 390.

5. The polyphenylene ether-styrene resin composition of claim 1 wherein the 3-hydroxyalkyl phosphine oxide is tris(3-hydroxypropyl)phosphine oxide.

6. The polyphenylene ether-styrene resin composition of claim 1 wherein the 3-hydroxyalkyl phosphine oxide is tris(2-methyl-3-hydroxypropyl)phosphine oxide.

7. The polyphenylene ether-styrene resin composition of claim 1 wherein the 3-hydroxyalkyl phosphine oxide is n-butyl bis(3-hydroxypropyl)phosphine oxide.

8. The polyphenylene ether-styrene resin composition of claim 1 wherein the 3-hydroxyalkyl phosphine oxide is s-butyl bis(3-hydroxypropyl)phosphine oxide.

9. The polyphenylene ether-styrene resin composition of claim 3 having incorporated therewith 5 parts per hundred of isopropylphenyl/phenyl phosphate.

10. The polyphenylene ether-styrene resin composition of claim 9 wherein said isopropylphenyl/phenyl phosphate has a molecular weight of about 369.

11. The polyphenylene ether-styrene resin composition of claim 10 having incorporated therewith 3 parts per hundred of s-butyl bis(2-hydroxypropyl)phosphine oxide.

12. The polyphenylene ether-styrene resin composition of claim 1 containing about 40 weight percent polyphenylene ether, about 60 weight percent polystyrene and having incorporated therewith about 4 parts per hundred of an isopropylphenyl/phenyl phosphate and about 2.5 parts per hundred of s-butyl bis(3-hydroxypropyl) phosphine oxide.

13. The polyphenylene ether-styrene resin composition of claim 1 containing about 34 weight percent polyphenylene ether, about 66 weight percent polystyrene having incorporated therewith about 4 parts per hundred of isopropylphenyl/phenyl phosphate, and about 3 parts per hundred of s-butyl bis(3-hydroxypropyl) phosphine oxide.

14. The polyphenylene ether-styrene resin composition of claim 1 containing about 30 weight percent of polyphenylene ether and about 70 weight percent of polystyrene having incorporated therewith about 5 parts per hundred of isopropylphenyl/phenyl phosphate and 3 parts per hundred of s-butyl bis(3-hydroxypropyl) phosphine oxide.

* * * * *